US011156484B2

(12) United States Patent
Fountain

(10) Patent No.: US 11,156,484 B2
(45) Date of Patent: Oct. 26, 2021

(54) VEHICLE SENSOR ARMOR SYSTEM

(71) Applicant: JOMAX CUSTOMS LLC, Wittmann, AZ (US)

(72) Inventor: Mark Fountain, Wittmann, AZ (US)

(73) Assignee: Jomax Customs LLC, Wittmann, AZ (US)

(*) Notice: Subject to any disclaimer, the term of this patent is extended or adjusted under 35 U.S.C. 154(b) by 0 days.

(21) Appl. No.: 17/083,534

(22) Filed: Oct. 29, 2020

(65) Prior Publication Data

US 2021/0131836 A1    May 6, 2021

Related U.S. Application Data

(60) Provisional application No. 62/929,493, filed on Nov. 1, 2019.

(51) Int. Cl.
*G01D 11/24* (2006.01)
*B60R 16/02* (2006.01)

(52) U.S. Cl.
CPC ........ *G01D 11/245* (2013.01); *B60R 16/0215* (2013.01)

(58) Field of Classification Search
CPC .......................... G01D 11/245; B60R 16/0215
See application file for complete search history.

(56) References Cited

U.S. PATENT DOCUMENTS

2016/0054348 A1* 2/2016 Kato ...................... B60T 8/171
324/166

* cited by examiner

*Primary Examiner* — Jamel E Williams
(74) *Attorney, Agent, or Firm* — Preston P. Frischknecht; Project CIP

(57) ABSTRACT

A vehicle sensor armor system with one or more sensor armor units configured to protect a vehicle sensor. Sensor armor units have a housing and mount connections configured to attach to a vehicle at existing connection points without further modifications. Sensor armor units have a plurality of contact points configured to contact the vehicle's structure and distribute forces away from a vehicle sensor and towards the vehicle's structure when attached to the vehicle in operation.

17 Claims, 13 Drawing Sheets

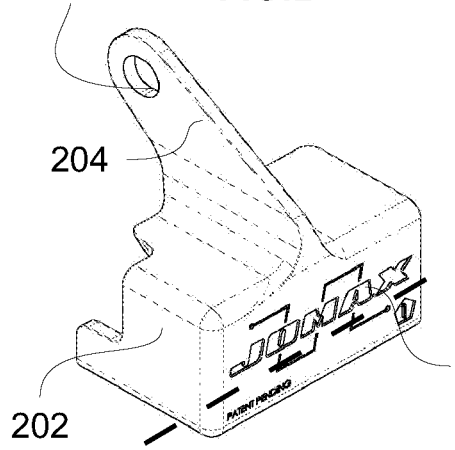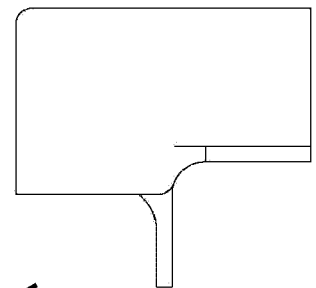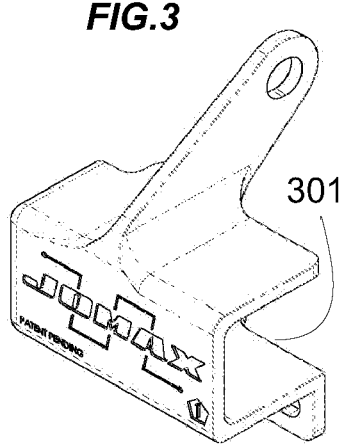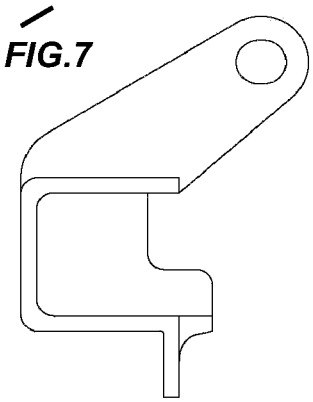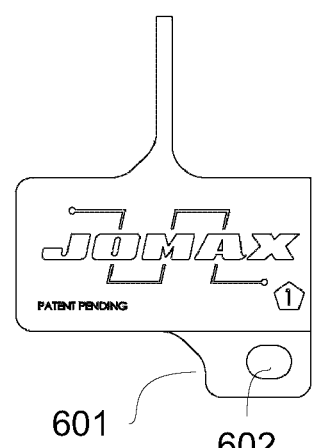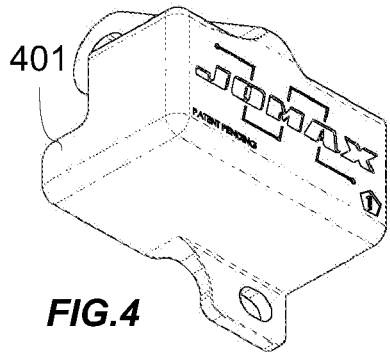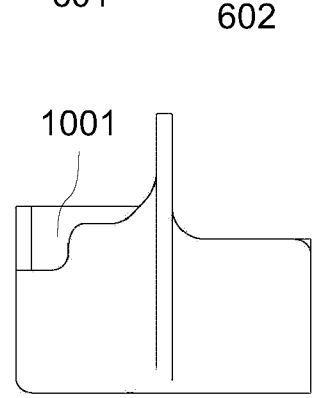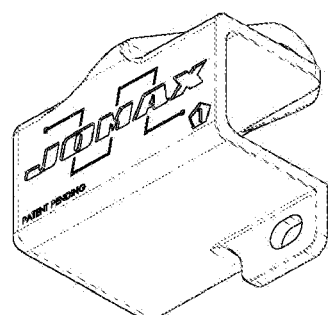

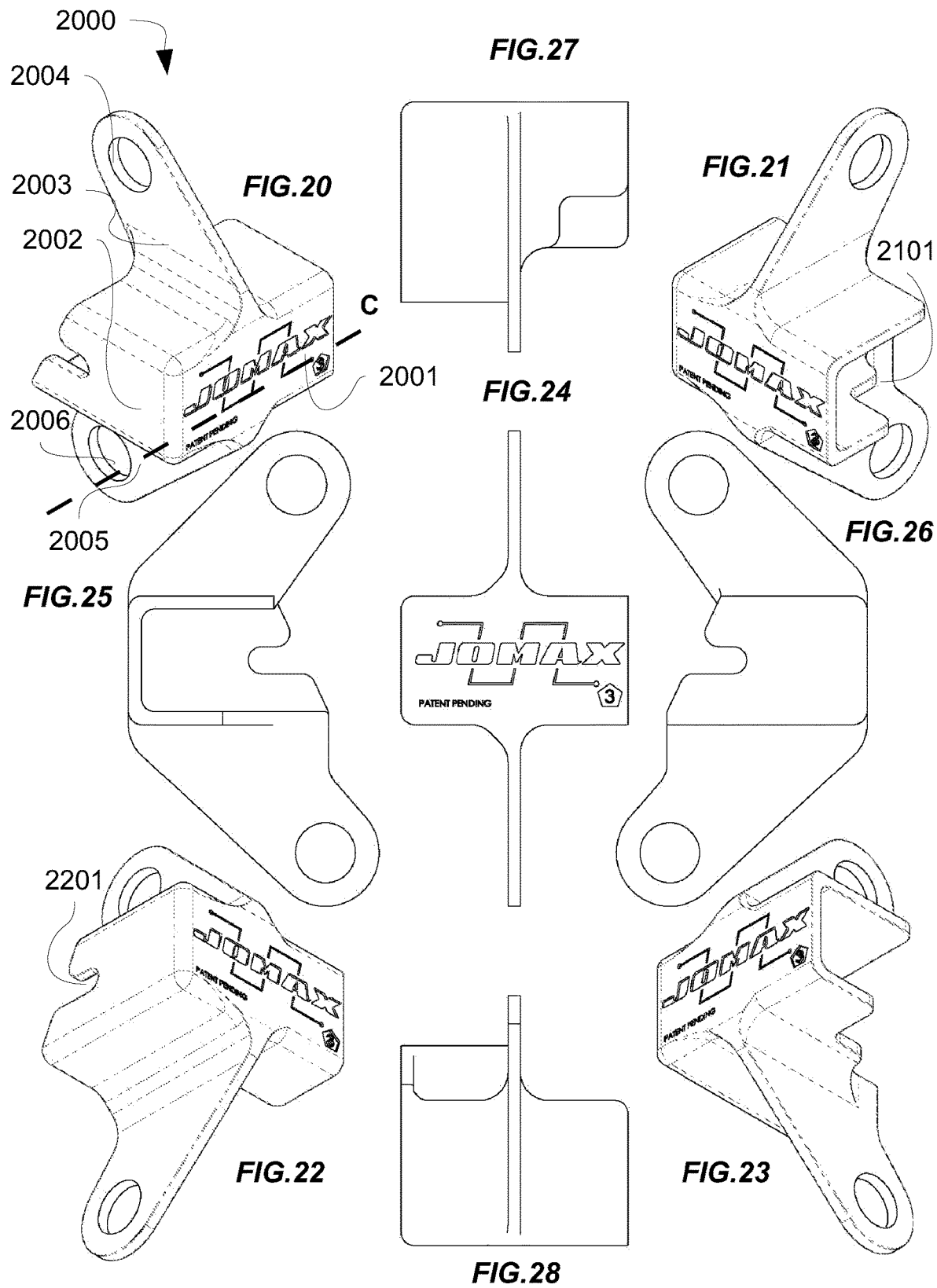

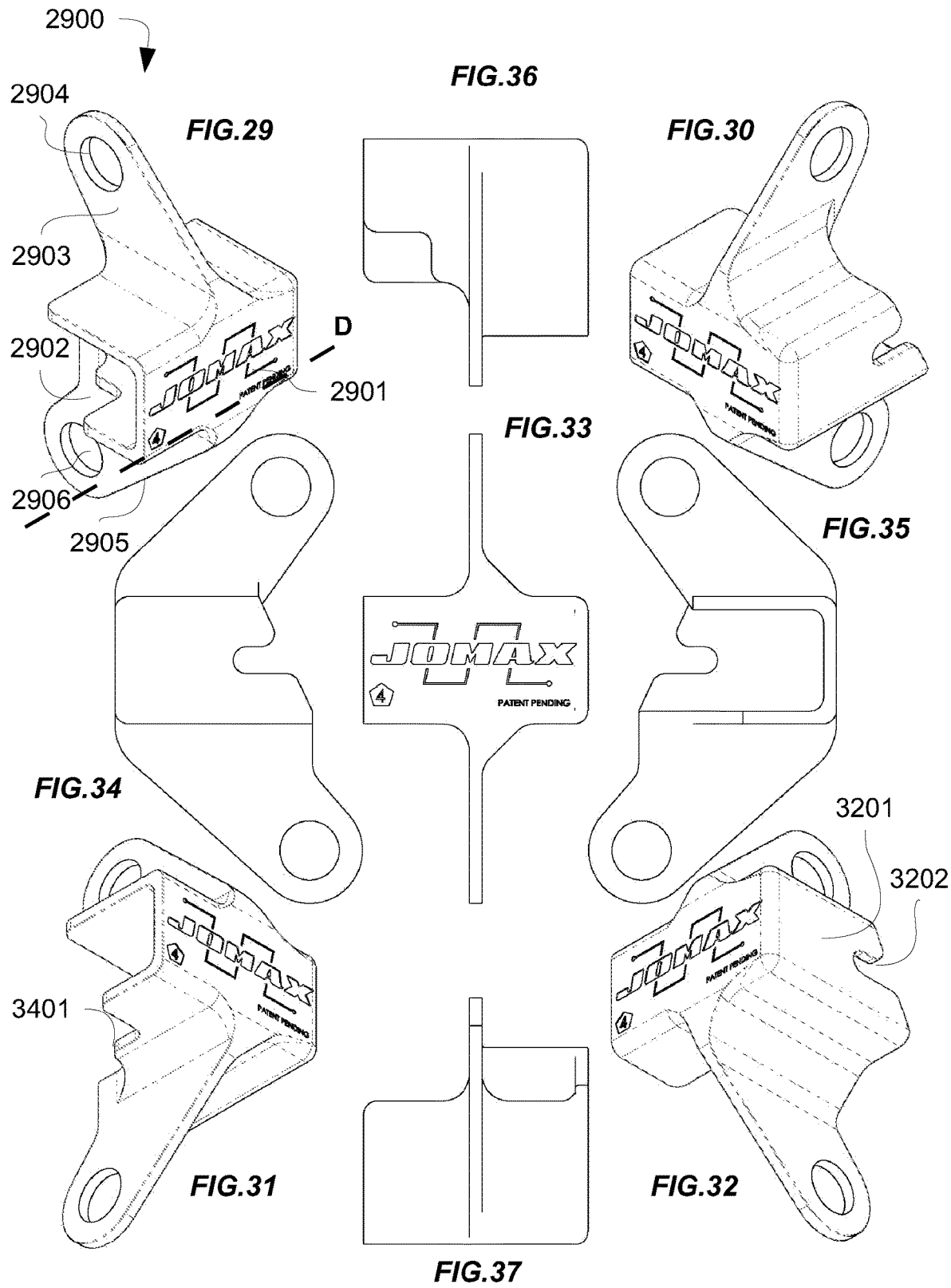

VEHICLE SENSOR ARMOR SYSTEM

RELATED APPLICATIONS

This application claims priority to U.S. Provisional Patent Application No. 62/929,493, filed on Nov. 1, 2019, and incorporated herein by reference.

BACKGROUND OF THE INVENTION

Passenger vehicles utilize wheel speed sensors for a variety of functions. For example, wheel speed sensors may be the primary data source for anti-lock brake (ABS) systems. In order for the ABS system to react to driving conditions, wheel speed sensors are placed on all four wheels, and constantly transmit the speed of each wheel to the ABS control module. Wheel sensors are typically mounted in the hub, close to brake calipers, where they can monitor how fast the axle is turning.

Many vehicles that utilize such speed sensors are used or purposed for off-road or similar driving applications. In such conditions, there is an increased risk that vehicle surfaces are struck or damaged by debris or other extreme forces. The locations of speed sensors (e.g., low to the ground, adjacent each wheel, in front of CV joints) results in increased risk of damage and vulnerability in off-road applications. Significantly, damage to speed sensors may create unsafe conditions by causing vehicles to disengage from four-wheel drive just as such functionality is needed to negotiate hazardous conditions. Moreover, repairs to damaged sensors are difficult and costly—inexpensive aftermarket solutions are typically unavailable and expensive OEM parts and dealer repairs are often required.

Existing sensor covers attempt to address these issues, but current designs do not provide adequate levels of protection and secure mounting to vehicles. For example, an existing design of sensor cover uses one point of connection to a spindle bolt location adjacent to the sensor. This single point of connection design is insecure and highly susceptible to rotational and other forces that result in damage not only to the sensor, but also shearing and/or stripping of the spindle bolt, rendering the vehicle inoperable and requiring expensive repairs.

Therefore, what is needed is a new type of aftermarket vehicle sensor armor system that provides robust protection against the risk of speed sensor damage through secure mounting to existing vehicle connections and optimal load displacement of forces experienced in off-roading and other severe applications.

SUMMARY OF THE INVENTION

In accordance with the above, a new and innovative vehicle sensor armor system is provided. The vehicle sensor armor system includes: one or more sensor armor units configured to protect a vehicle sensor, the one or more sensor armor units having a housing and two or more mount connections configured to attach to a vehicle at existing connection points without modifications and a plurality of contact points configured to contact the vehicle's structure and distribute forces away from a vehicle sensor and towards the vehicle's structure when the sensor armor unit is attached to a vehicle in operation.

These and other aspects of the present invention will become more fully apparent from the following description and appended claim, or they may be learned by the practice of the invention as set forth hereinafter.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through the use of the accompanying drawings in which:

FIG. 2 is a top front left perspective view of a first sensor armor unit in a first embodiment of a vehicle sensor armor system.

FIG. 3 is a top front right perspective view of a first sensor armor unit in a first embodiment of a vehicle sensor armor system.

FIG. 4 is a bottom front left perspective view of a first sensor armor unit in a first embodiment of a vehicle sensor armor system.

FIG. 5 is a bottom front right perspective view of a first sensor armor unit in a first embodiment of a vehicle sensor armor system.

FIG. 6 is a front view of a first sensor armor unit in a first embodiment of a vehicle sensor armor system.

FIG. 7 is a right side view of a first sensor armor unit in a first embodiment of a vehicle sensor armor system.

FIG. 8 is a left side view of a first sensor armor unit in a first embodiment of a vehicle sensor armor system.

FIG. 9 is a bottom view of a first sensor armor unit in a first embodiment of a vehicle sensor armor system.

FIG. 10 is a top view of a first sensor armor unit in a first embodiment of a vehicle sensor armor system.

FIG. 20 is a top front left perspective view of a third sensor armor unit in a first embodiment of a vehicle sensor armor system.

FIG. 21 is a top front right perspective view of a third sensor armor unit in a first embodiment of a vehicle sensor armor system.

FIG. 22 is a bottom front left perspective view of a third sensor armor unit in a first embodiment of a vehicle sensor armor system.

FIG. 23 is a bottom front right perspective view of a third sensor armor unit in a first embodiment of a vehicle sensor armor system.

FIG. 24 is a front view of a third sensor armor unit in a first embodiment of a vehicle sensor armor system.

FIG. 25 is a right side view of a third sensor armor unit in a first embodiment of a vehicle sensor armor system.

FIG. 26 is a left side view of a third sensor armor unit in a first embodiment of a vehicle sensor armor system.

FIG. 27 is a bottom view of a third sensor armor unit in a first embodiment of a vehicle sensor armor system.

FIG. 28 is a top view of a third sensor armor unit in a first embodiment of a vehicle sensor armor system.

FIG. 29 is a top front left perspective view of a third sensor armor unit in a first embodiment of a vehicle sensor armor system.

FIG. 30 is a top front right perspective view of a fourth sensor armor unit in a first embodiment of a vehicle sensor armor system.

FIG. 31 is a bottom front left perspective view of a fourth sensor armor unit in a first embodiment of a vehicle sensor armor system.

FIG. 32 is a bottom front right perspective view of a fourth sensor armor unit in a first embodiment of a vehicle sensor armor system.

FIG. 33 is a front view of a fourth sensor armor unit in a first embodiment of a vehicle sensor armor system.

FIG. 34 is a right side view of a fourth sensor armor unit in a first embodiment of a vehicle sensor armor system.

FIG. 35 is a left side view of a fourth sensor armor unit in a first embodiment of a vehicle sensor armor system.

FIG. 36 is a bottom view of a fourth sensor armor unit in a first embodiment of a vehicle sensor armor system.

FIG. 37 is a top view of a fourth sensor armor unit in a first embodiment of a vehicle sensor armor system.

DETAILED DESCRIPTION OF THE ILLUSTRATED EMBODIMENT

The present invention in its various embodiments, some of which are depicted in the figures herein, is a vehicle sensor armor system.

Figure 1:
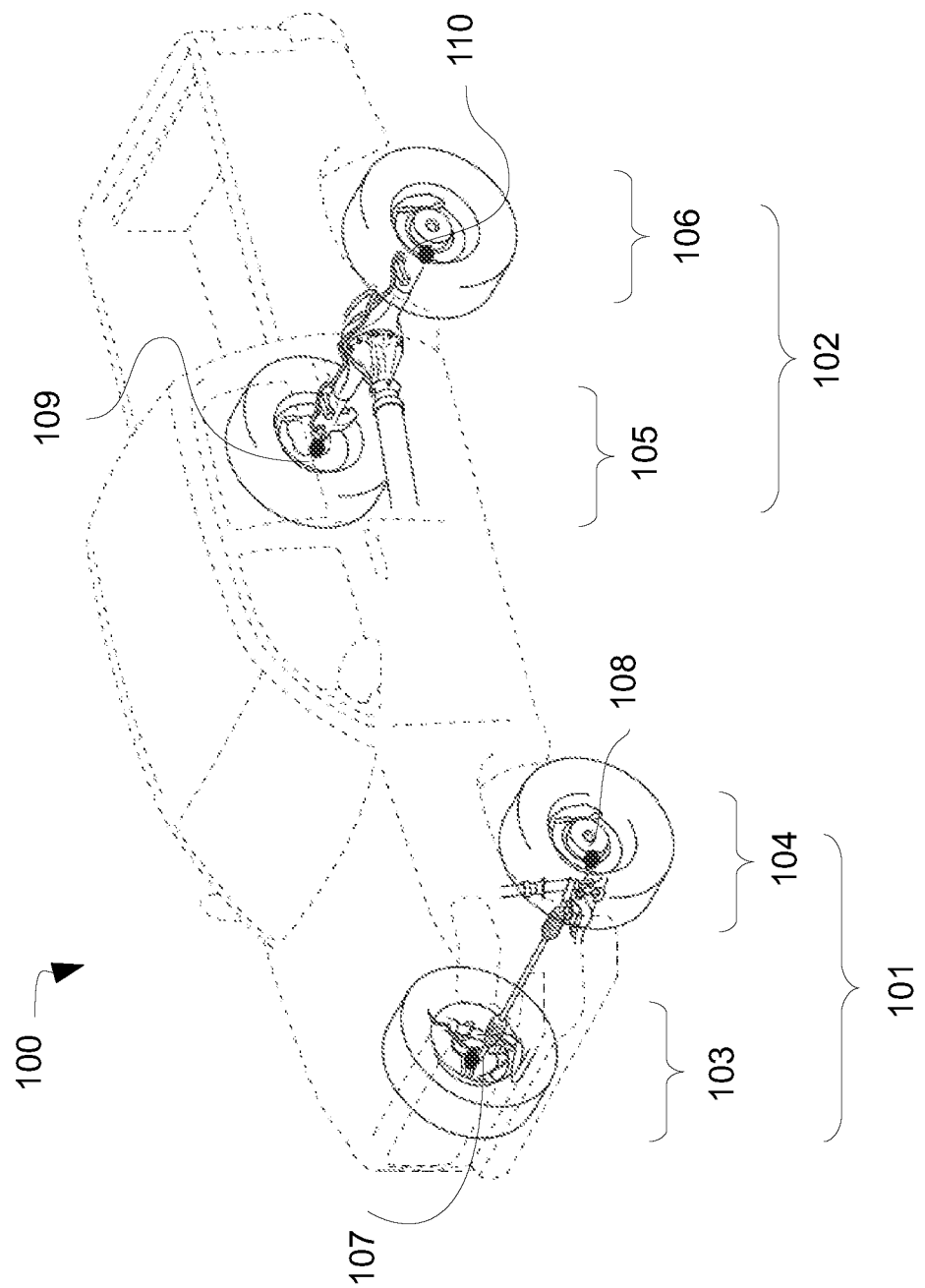
FIG. 1 is a perspective view of exemplary sensor configurations relating to one embodiment of a vehicle sensor armor system.
Figure 11:
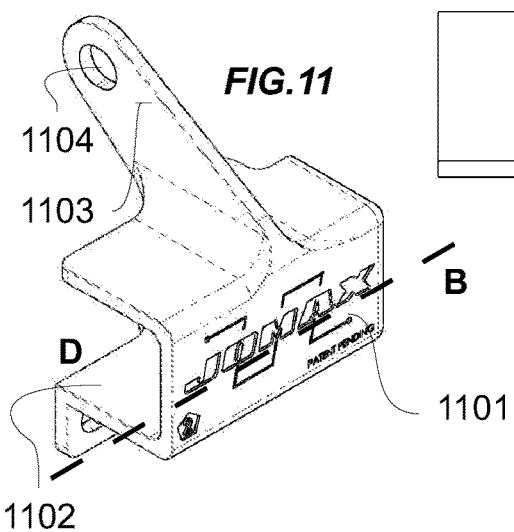
FIG. 11 is a top front left perspective view of a second sensor armor unit in a first embodiment of a vehicle sensor armor system.
Figure 18:
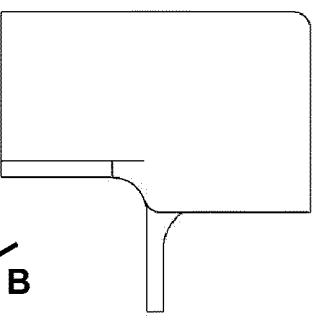
FIG. 18 is a bottom view of a second sensor armor unit in a first embodiment of a vehicle sensor armor system.
Figure 12:
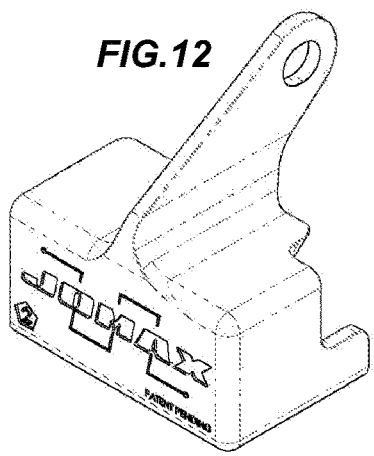
FIG. 12 is a top front right perspective view of a second sensor armor unit in a first embodiment of a vehicle sensor armor system.
Figure 16:
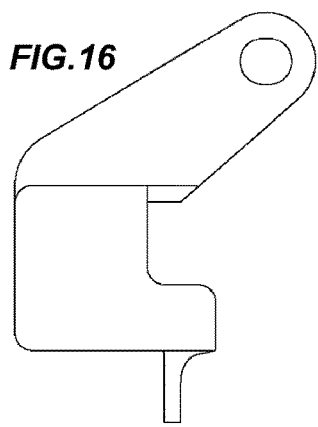
FIG. 16 is a right side view of a second sensor armor unit in a first embodiment of a vehicle sensor armor system.
Figure 15:
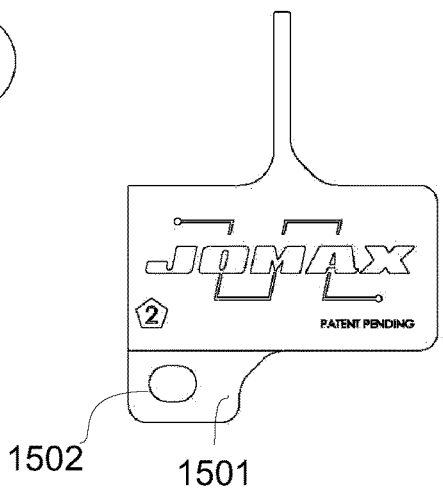
FIG. 15 is a front view of a second sensor armor unit in a first embodiment of a vehicle sensor armor system.
Figure 17:
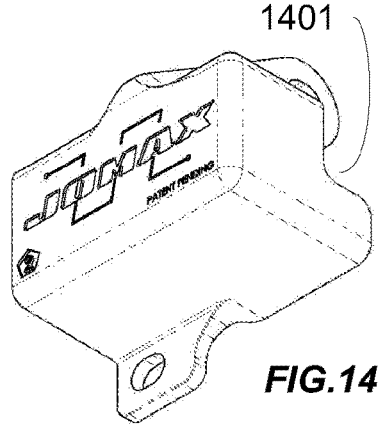
FIG. 17 is a left side view of a second sensor armor unit in a first embodiment of a vehicle sensor armor system.
Figure 13:
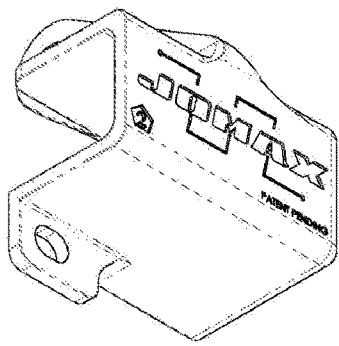
FIG. 13 is a bottom front left perspective view of a second sensor armor unit in a first embodiment of a vehicle sensor armor system.
Figure 19:
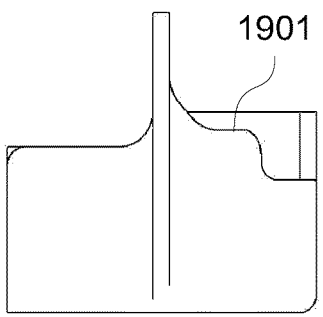
FIG. 19 is a top view of a second sensor armor unit in a first embodiment of a vehicle sensor armor system.
Figure 14:
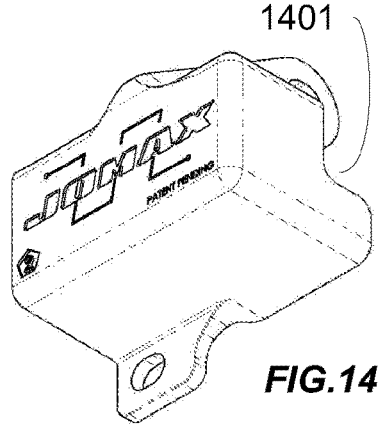
FIG. 14 is a bottom front right perspective view of a second sensor armor unit in a first embodiment of a vehicle sensor armor system.

Referring now to FIG. 1, exemplary front and rear speed sensor configuration and positioning which relate to one embodiment of a vehicle sensor system 100, are shown. The configurations illustrated herein correspond to a Toyota Tundra truck model, although the vehicle sensor system and various components described below may be adapted to any number of other vehicles and/or vehicle types, without departing from the purpose and scope of the invention. The configuration 100 of FIG. 1 shows a front wheel assembly 101 with a front right (passenger side) wheel subassembly 103 and adjacent speed sensor 107, and a front left (driver's side) wheel subassembly 104 and adjacent speed sensor 108. The configuration 100 of FIG. 1 also shows a rear wheel assembly 102 with a rear right (passenger side) wheel subassembly 105 and adjacent speed sensor 109, and a rear left (driver's side) wheel subassembly 106 and adjacent speed sensor 110. Thus arrayed, sensors 107, 108, 109, and 110 are vulnerable to damage and extreme forces from road debris, off-road environments, rock-crawling, pressure jetting or cleaning, and other conditions of vehicular commute.

Referring now to FIGS. 2 through 37, sensor armor units in a first embodiment of a vehicle sensor armor system that correspond to one or more vehicle sensors or vehicle sensor arrays as described above, are shown. Depending on the specific embodiment, the vehicle sensor armor system may contain one, two, three, four, and/or more sensor armor units, sold individually and/or together as a kit.

In FIGS. 2 through 10, an exemplary first sensor armor unit 200 is shown configured for protection of a front left and/or driver side speed sensor. First sensor armor unit 200 is comprised of a substantially enclosed housing 201 for protecting a speed sensor, the housing 201 having top, bottom, front, and left 202 sides. Exemplary dimensions of the housing are: between one and a half (1.5) and three and a half (3.5) inches in width, half an inch (0.5) and one and a half (1.5) inches in height; and half an inch (0.5) to two (2) inches in depth. In various embodiments, a right side 301 and/or back of the housing 201 may be substantially open. A first mount includes a first mounting arm 204 that is connected to and extends distally from the top of the housing 201. First mounting arm 204 has an aperture 205 adjacent to a distal end of the first mounting arm 204 that is oriented parallel to a longitudinal axis A of the housing 201. A second mount includes a second mounting arm 601 that is connected to and extends distally from the bottom of the housing 201. Second mounting arm 601 has an aperture 602 adjacent to a distal end that is oriented perpendicular to a longitudinal axis A of the housing 201. Second mounting arm 601 may be formed as a bracket. Exemplary vertical distance between the first mounting arm aperture 205 and second mounting arm aperture may be between one (1) and three (3) inches. Other cutout features (e.g., 401, 1001) may be incorporated into the housing 201 to accommodate existing vehicle structure and/or sensor features or connections such as wiring. In various embodiments, the sensor armor unit 200 is a single piece of metal.

In FIGS. 11 through 19, an exemplary second sensor armor unit 1100 is shown configured for protection of a front right and/or passenger side speed sensor. Second sensor armor unit 1100 is comprised of a substantially enclosed housing 1101 for protecting a speed sensor, the housing 1811 having top, bottom, front, and left 1102 sides. Exemplary dimensions of the housing are: between one and a half (1.5) and three and a half (3.5) inches in width, half an inch (0.5) and one and a half (1.5) inches in height; and half an inch (0.5) to two (2) inches in depth. In various embodiments, a left side 1102 and/or back of the housing 1101 may be substantially open. A first mount includes a first mounting arm 1103 that is connected to and extends distally from the top of the housing 1101. First mounting arm 1103 has an aperture 1104 adjacent to a distal end of the first mounting arm 1103 that is oriented parallel to a longitudinal axis B of the housing 1101. A second mount includes a second mounting arm 1501 that is connected to and extends distally from the bottom of the housing 1101. Second mounting arm 1501 has an aperture 1502 adjacent to a distal end that is oriented perpendicular to a longitudinal axis B of the housing 1101. Second mounting arm 1502 may be formed as a bracket. Exemplary vertical distance between the first mounting arm aperture 205 and second mounting arm aperture may be between one (1) and three (3) inches. Other cutout features (e.g., 1401, 1901) may be incorporated into the housing 1101 to accommodate existing vehicle structure and/or sensor features or connections such as wiring. In various embodiments, the sensor armor unit 1100 is a single piece of metal.

In FIGS. 20 through 28, an exemplary third sensor armor unit 2000 is shown configured for protection of a rear left and/or driver side speed sensor. Third sensor armor unit 2000 is comprised of a substantially enclosed housing 2001 for protecting a sensor, the housing 2001 having top, bottom, front, and left 2002 sides. Exemplary dimensions of the housing are: between one and a half (1.5) and three and a half (3.5) inches in width, half an inch (0.5) and one and a half (1.5) inches in height; and half an inch (0.5) to two (2) inches in depth. In various embodiments, a right side 2101 and/or back of the housing 2001 may be substantially open. A first mount includes a first mounting arm 2003 that is connected to and extends distally from the top of the housing 2001. First mounting arm 2003 has an aperture 2004 adjacent to a distal end that is oriented parallel to a longitudinal axis C of the housing 2001. A second mount includes a second mounting arm 2005 that is connected to and extends distally from the bottom of the housing 2001. Second mounting arm 2005 has an aperture 2006 adjacent to a distal end that is also oriented parallel to a longitudinal axis C of the housing 2001. Exemplary vertical distance between the first mounting arm aperture 2004 and second mounting arm aperture 2006 may be between two (2) and four (4) inches. Other cutout features (e.g., 2101, 2201) may be incorporated into the housing 2001 to accommodate existing vehicle structure and/or sensor features or connections such as wiring. In various embodiments, the sensor armor unit 2000 is a single piece of metal.

In FIGS. 29 through 37, an exemplary fourth sensor armor unit 2900 is shown configured for protection of a rear right and/or passenger side speed sensor. Fourth sensor armor unit 2900 is comprised of a substantially enclosed housing 2901 for protecting a sensor, the housing 2901 having top, bottom, front, and right 3201 sides. Exemplary dimensions of the housing are: between one and a half (1.5) and three and a half (3.5) inches in width, half an inch (0.5) and one and a half (1.5) inches in height; and half an inch (0.5) to two (2) inches in depth. In various embodiments, a left side 2902 and/or back of the housing 2901 may be substantially open. A first mount includes a first mounting arm 2903 that is connected to and extends distally from the top of the housing 2901. First mounting arm 2903 has an aperture 2904 adjacent to a distal end that is oriented parallel to a longitudinal axis D of the housing 2901. A second mount includes a second mounting arm 2905 that is connected to and extends distally from the bottom of the housing 2001. Second mounting arm 2905 has an aperture 2906 adjacent to a distal end that is also oriented parallel to a longitudinal axis D of the housing 2001. Exemplary vertical distance between the first mounting arm aperture 2904 and second mounting arm aperture 2906 may be between two (2) and four (4) inches. Other cutout features (e.g., 3401, 3202) may be incorporated into the housing 2901 to accommodate existing vehicle structure and/or sensor features or connections such as wiring. In various embodiments, the sensor armor unit 2900 is a single piece of metal.

Figure 38:
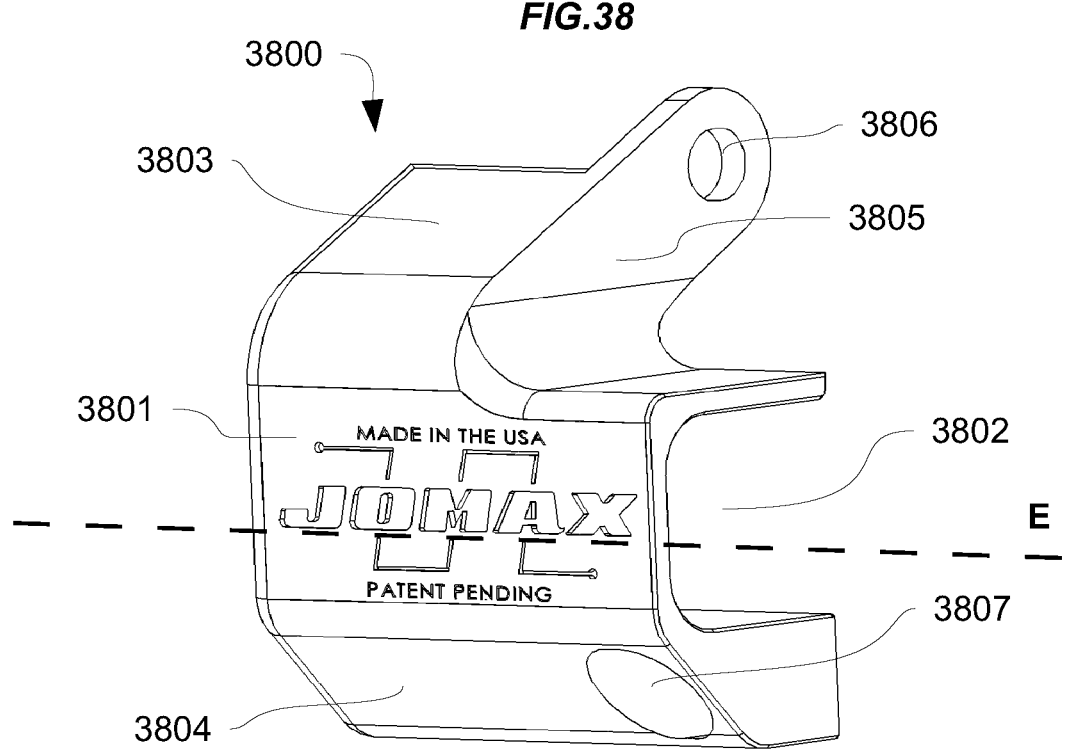
FIG. 38 is a rear perspective view of a first sensor armor unit in a second embodiment of a vehicle sensor armor system.
Figure 39:
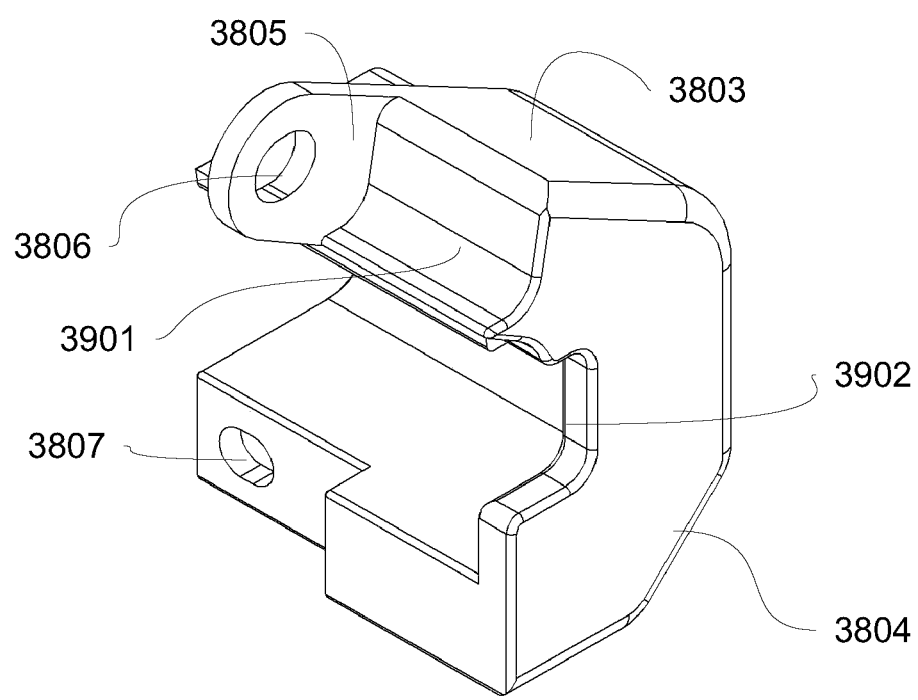
FIG. 39 is a front perspective view of a first sensor armor unit in a second embodiment of a vehicle sensor armor system.

In FIGS. 38 and 39, a second embodiment of a first sensor armor unit 3800 is shown. In FIGS. 38 and 39, first sensor armor unit 3800 is shown configured for protection of a front left and/or driver side speed sensor. First sensor armor unit 3800 is comprised of a substantially enclosed housing 3801 for protecting a speed sensor, the housing 3801 having top, bottom, front, and left 202 sides. Exemplary dimensions of the housing are: between one and a half (1.5) and three and a half (3.5) inches in width, half an inch (0.5) and one and a half (1.5) inches in height; and half an inch (0.5) to two (2) inches in depth. In various embodiments, a right side 3802 and/or back of the housing 3801 may be substantially open.

In the embodiment of FIGS. 38 and 39, the housing 3801 may also have one or more forward-facing, angled or curved facets 3803, 3804 adjacent to the housing 3801 top and/or bottom. Forward-facing, or angled or curved facets 3803, 3804 provide increased deflection of road debris or foreign objects that strike the sensor armor unit. They also serve to increase the core material of the sensor armor unit for increased deflection, yield capabilities, and strength. Housing 3801 may also have one or more rear-facing angled or curved facets 3901 that complement connection to a vehicle, cable routing and/or increase core strength.

A first mount includes a first mounting arm 3805 that is connected to and extends distally from the top of the housing 3801. First mounting arm 3805 has an aperture 3806 adjacent to a distal end of the first mounting arm 3805 that is oriented parallel to a longitudinal axis E of the housing 3801. A second mount includes an aperture 3807 on a forward-facing, angled facet 3804 adjacent to the bottom of the housing 3801. Aperture 3807 is adjacent to a distal end that is oriented perpendicular to a longitudinal axis E of the housing 3801. Exemplary vertical distance between the first mounting arm aperture 3806 and second mount aperture 3807 may be between one (1) and three (3) inches. Other cutout features (e.g., 3902) may be incorporated into the housing 3801 to accommodate existing vehicle structure and/or sensor features or connections such as wiring. In various embodiments, the sensor armor unit 3800 is a single piece of metal.

Figure 40:
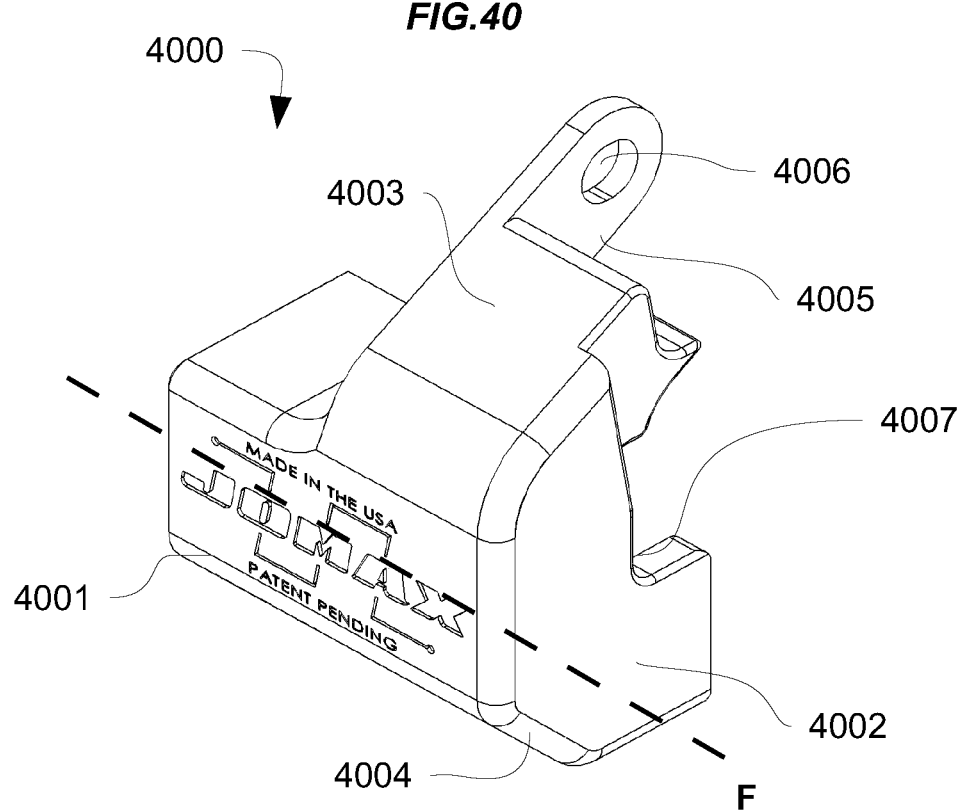
FIG. 40 is a front perspective view of a second sensor armor unit in a second embodiment of a vehicle sensor armor system.
Figure 41:
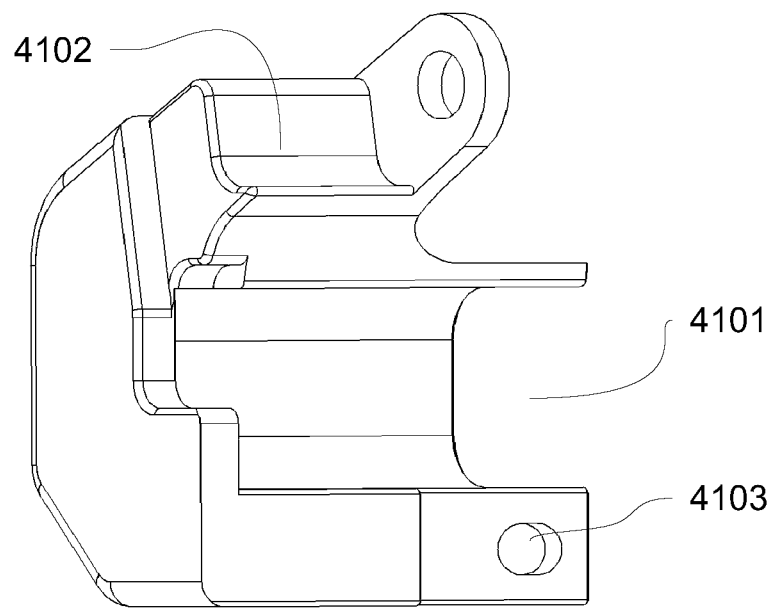
FIG. 41 is a rear perspective view of a second sensor armor unit in a second embodiment of a vehicle sensor armor system.

In FIGS. 40 and 41, a second embodiment of a second sensor armor unit 4000 is shown. In FIGS. 40 and 41, second sensor armor unit 4000 is shown configured for protection of a front right and/or passenger side speed sensor. Second sensor armor unit 4000 is comprised of a substantially enclosed housing 4001 for protecting a speed sensor, the housing 4001 having top, bottom, front, and right 4002 sides. Exemplary dimensions of the housing are: between one and a half (1.5) and three and a half (3.5) inches in width, half an inch (0.5) and one and a half (1.5) inches in height; and half an inch (0.5) to two (2) inches in depth. In various embodiments, a left side 4101 and/or back of the housing 4001 may be substantially open. In the embodiment of FIGS. 40 and 41, the housing 4001 may also have one or more forward-facing, angled or curved facets 4003, 4004 adjacent to the housing 3801 top and/or bottom and one or more rear-facing angled or curved facets 4102.

A first mount includes a first mounting arm 4005 that is connected to and extends distally from the top of the housing 4001. First mounting arm 4005 has an aperture 4006 adjacent to a distal end of the first mounting arm 4005 that is oriented parallel to a longitudinal axis F of the housing 4001. A second mount includes an aperture 4103 on a forward-facing, angled facet 4004 adjacent to the bottom of the housing 4001. Aperture 4103 is adjacent to a distal end that is oriented perpendicular to a longitudinal axis F of the housing 4001. Exemplary vertical distance between the first mounting arm aperture 4006 and second mount aperture may be between one (1) and three (3) inches. Other cutout features (e.g., 4007) may be incorporated into the housing 4001 to accommodate existing vehicle structure and/or sensor features or connections such as wiring. In various embodiments, the sensor armor unit 4000 is a single piece of metal.

Figure 42:
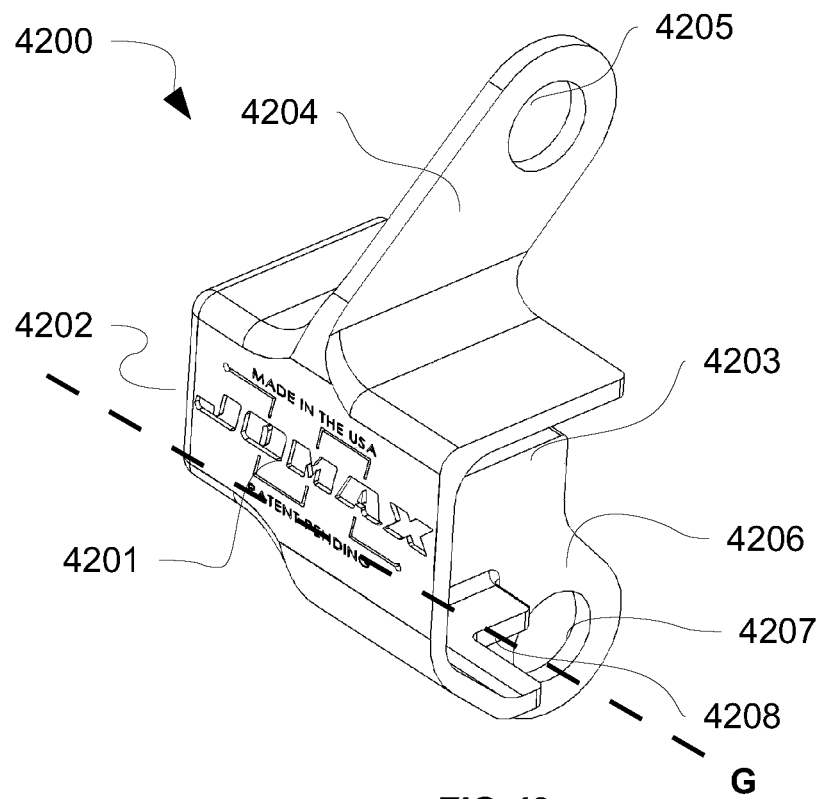
FIG. 42 is a front perspective view of a third sensor armor unit in a second embodiment of a vehicle sensor armor system.
Figure 43:
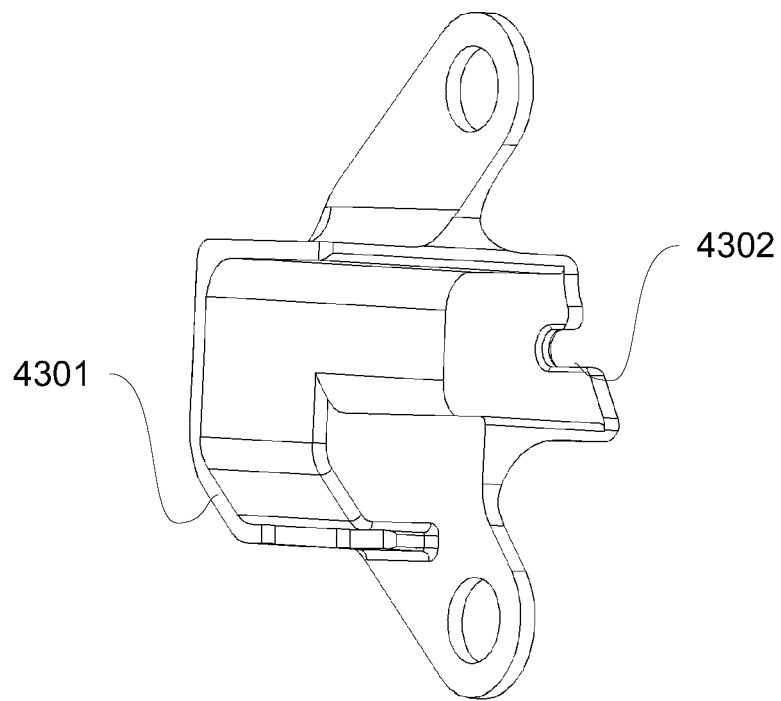
FIG. 43 is a rear perspective view of a third sensor armor unit in a second embodiment of a vehicle sensor armor system.

In FIGS. 42 and 43, a second embodiment of a third sensor armor unit 4200 is shown. In FIGS. 38 and 39, third sensor armor unit 3800 is shown configured for protection of a rear left and/or driver side speed sensor. Third sensor armor unit 4200 is comprised of a substantially enclosed housing 4201 for protecting a sensor, the housing 4201 having top, bottom, front, and left 4202 sides. Exemplary dimensions of the housing are: between one and a half (1.5) and three and a half (3.5) inches in width, half an inch (0.5) and one and a half (1.5) inches in height; and half an inch (0.5) to two (2) inches in depth. In various embodiments, a right side 4203 and/or back of the housing 4201 may be substantially open. Housing 4202 may also have one or more forward-facing, angled or curved facets 4301 adjacent to the housing 4201 top and/or bottom for increased deflection of road debris or foreign and increasing strength.

A first mount includes a first mounting arm 4204 that is connected to and extends distally from the top of the housing 4201. First mounting arm 4204 has an aperture 4205 adjacent to a distal end that is oriented parallel to a longitudinal axis G of the housing 4201. A second mount includes a second mounting arm 4206 that is connected to and extends distally from the bottom of the housing 4201. Second mounting arm 4206 has an aperture 4207 adjacent to a distal end that is also oriented parallel to a longitudinal axis G of the housing 4201. Exemplary vertical distance between the first mounting arm aperture 4205 and second mounting arm aperture 4207 may be between two (2) and four (4) inches. Other cutout features (e.g., 4208, 4302) may be incorporated into the housing 4201 to accommodate existing vehicle structure and/or sensor features or connections such as wiring. In various embodiments, the sensor armor unit 4200 is a single piece of metal.

Figure 44:
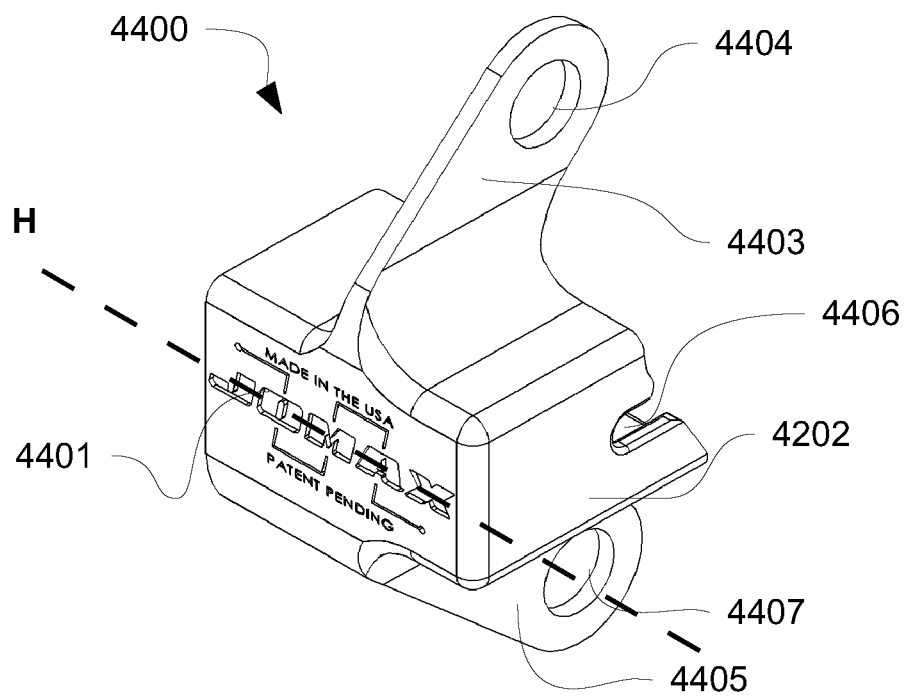
FIG. 44 is a front perspective view of a fourth sensor armor unit in a second embodiment of a vehicle sensor armor system.
Figure 45:
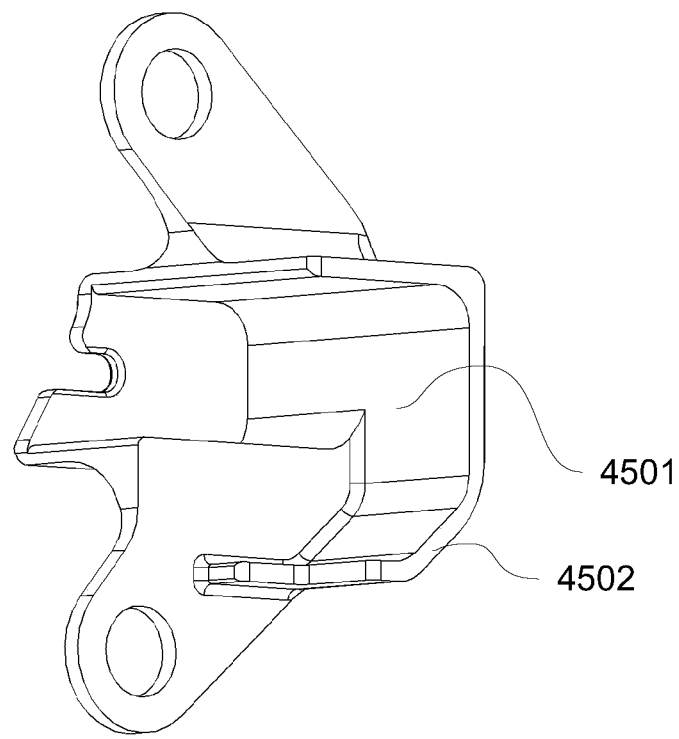
FIG. 45 is a rear perspective view of a fourth sensor armor unit in a second embodiment of a vehicle sensor armor system.

In FIGS. 44 and 45, a second embodiment of a fourth sensor armor unit 4400 is shown. In FIGS. 44 and 45, fourth sensor armor unit 4400 is shown configured for protection of a rear right and/or passenger side speed sensor. Fourth sensor armor unit 4400 is comprised of a substantially enclosed housing 4401 for protecting a sensor, the housing 4401 having top, bottom, front, and right 4202 sides. Exemplary dimensions of the housing are: between one and a half (1.5) and three and a half (3.5) inches in width, half an inch (0.5) and one and a half (1.5) inches in height; and half an inch (0.5) to two (2) inches in depth. In various embodiments, a left side 4501 and/or back of the housing 4401 may be substantially open. Housing 4401 may also have one or more forward-facing, angled or curved facets 4502 adjacent to the housing 4401 top and/or bottom for increased deflection of road debris or foreign and increasing strength.

A first mount includes a first mounting arm 4403 that is connected to and extends distally from the top of the housing 4401. First mounting arm 4403 has an aperture 4404 adjacent to a distal end that is oriented parallel to a longitudinal axis H of the housing 4401. A second mount includes a second mounting arm 4405 that is connected to and extends distally from the bottom of the housing 4401. Second mounting arm 4405 has an aperture 4407 adjacent to a distal end that is also oriented parallel to a longitudinal axis H of the housing 4401. Exemplary vertical distance between the first mounting arm aperture 4404 and second mounting arm aperture 4407 may be between two (2) and four (4) inches. Other cutout features (e.g., 4406) may be incorporated into the housing 4401 to accommodate existing vehicle structure and/or sensor features or connections such as wiring. In various embodiments, the sensor armor unit 4400 is a single piece of metal.

Across embodiments, sensor armor units and corresponding mounts are configured to easily attach to existing or OEM fastener locations with fasteners (e.g., bolts, screws and the like) without other modification to the vehicle required by an installer and/or user. For example, each aperture within the mount of each sensor armor unit may correspond positionally to an existing and/or separate vehicle connection and/or fastener location point such as may be found on or adjacent to vehicle structure that includes: vehicle spindles; suspension and steering equipment; studs on wheel housing; speed sensors; and any similar vehicle structure that may be in the vicinity of the speed sensors which the system seeks to protect.

Figure 46:
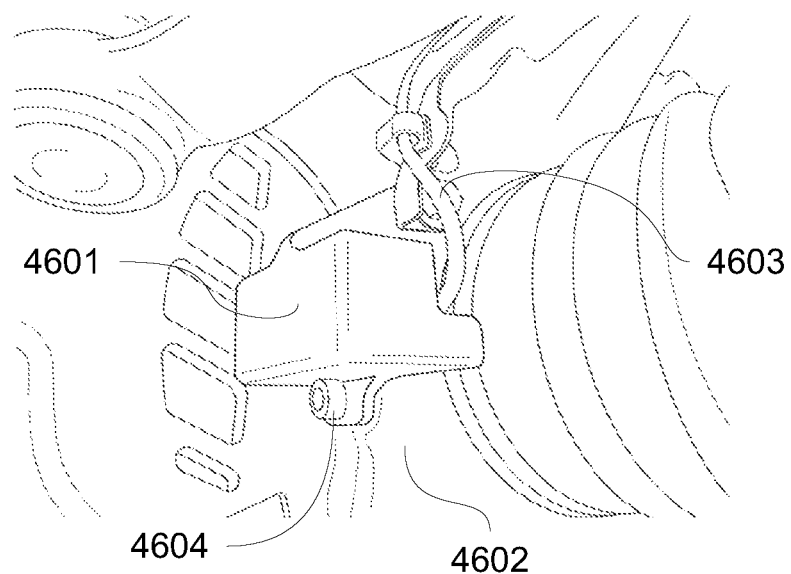
FIG. 46 is a sensor armor unit in a vehicle environment mounted within existing vehicle connections in one embodiment of a vehicle sensor armor system.
Figure 47:
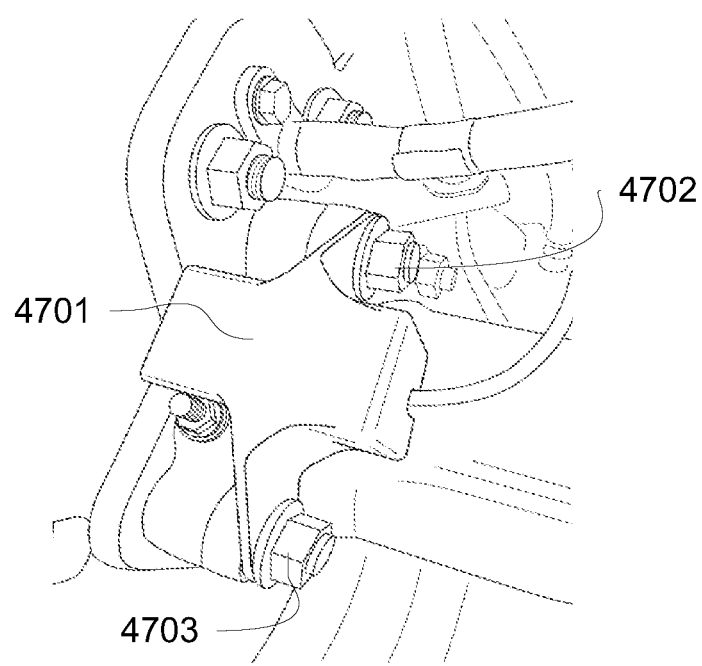
FIG. 47 is a sensor armor unit in a vehicle environment mounted within existing vehicle connections in one embodiment of a vehicle sensor armor system.

Referring now to FIG. 46, an exemplary sensor armor unit 4601 is shown attached within a vehicle environment at a front right and/or passenger side speed sensor location. Sensor armor unit 4601 is installed at existing OEM fastener locations 4603, 4604 within the spindle 4602. Referring to FIG. 47 another exemplary sensor armor unit 4701 is shown attached within a vehicle environment at a rear right and/or passenger side speed sensor location. Sensor armor unit 4701 is installed at existing OEM fastener locations 4702, 4703 at the studs of wheel housing.

Figure 48:
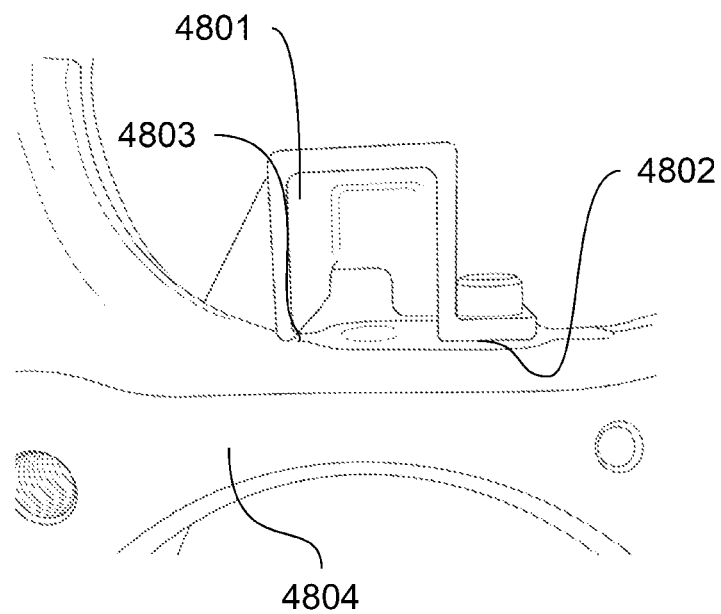
FIG. 48 is a first side view of a sensor armor unit mounted within existing vehicle connections in one embodiment of a vehicle sensor armor system.
Figure 49:
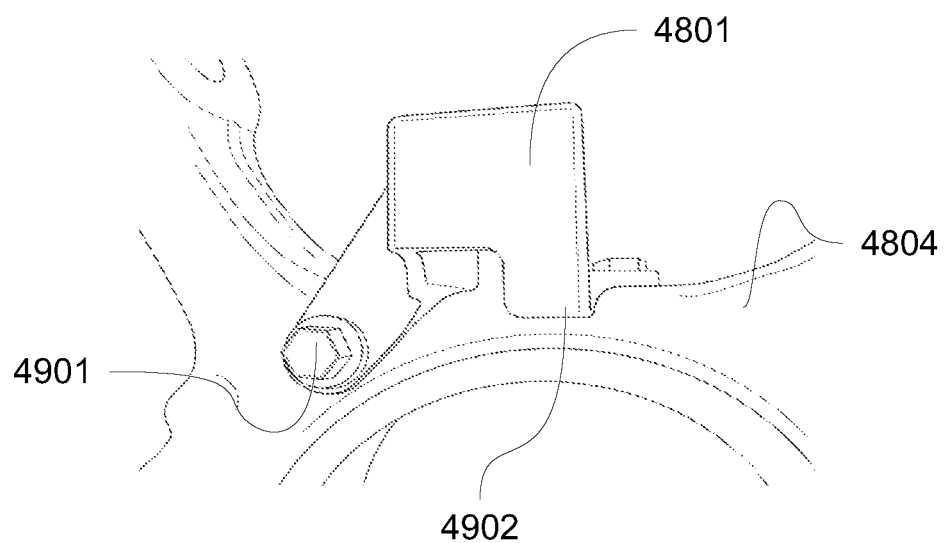
FIG. 49 is a second side view of a sensor armor unit mounted within existing vehicle connections in one embodiment of a vehicle sensor armor system.

Referring to FIGS. 48 and 49, sensor armor units 4801 are configured to optimize protection to corresponding sensors through specific functionality and structure. For example, secure mounting positions of sensor armor units may be located on opposing sides of the housing to prevent the rotational and other damage that would otherwise occur from outside forces in units with, e.g., only one mounting location on a top or bottom of housing. Moreover, when attached to a vehicle in operation, embodiments of sensor armor units 4801 have a plurality of contact points configured to contact the vehicle's structure 4804 and distribute forces away from a corresponding vehicle sensor and toward the vehicle's structure 4804. The plurality of sensor armor unit contact points may include mount locations 4802, 4901 as well as edges and/or surfaces 4803, 4902 of the sensor armor unit 4801 specifically designed to contact existing vehicle structure 4804. In another example, sensor armor units 4801 provide a common air and/or space gap around sensors to allow for a significant degree of sensor unit deformation prior to potential damage to sensors. In preferred embodiments, this air and/or space gap is between one sixteenth (1/16) of an inch and five eighths (5/8) of an inch.

Figure 50:
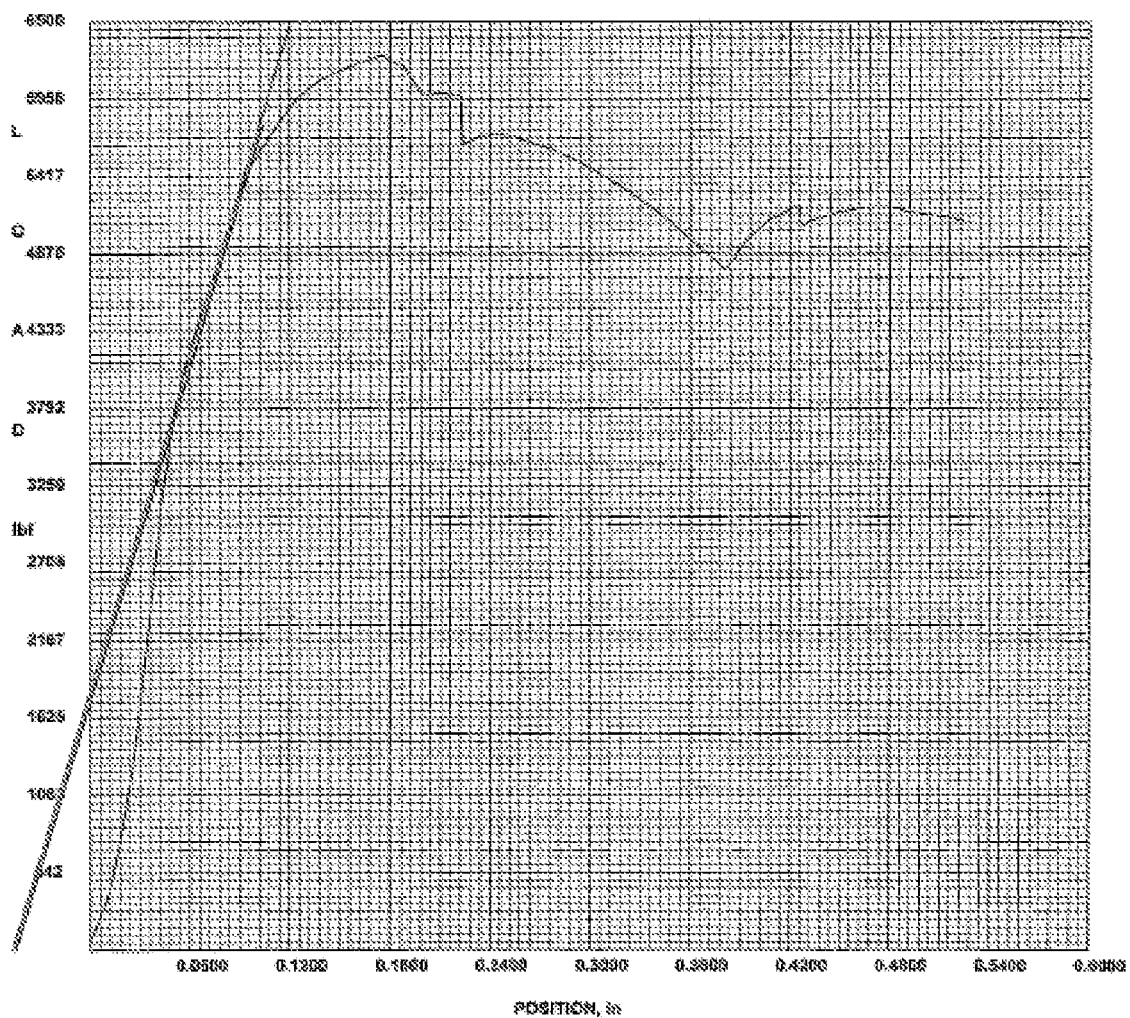
FIG. 50 is a summary of force testing information for sensor armor units in one embodiment of a vehicle sensor armor system.
Figure 51:
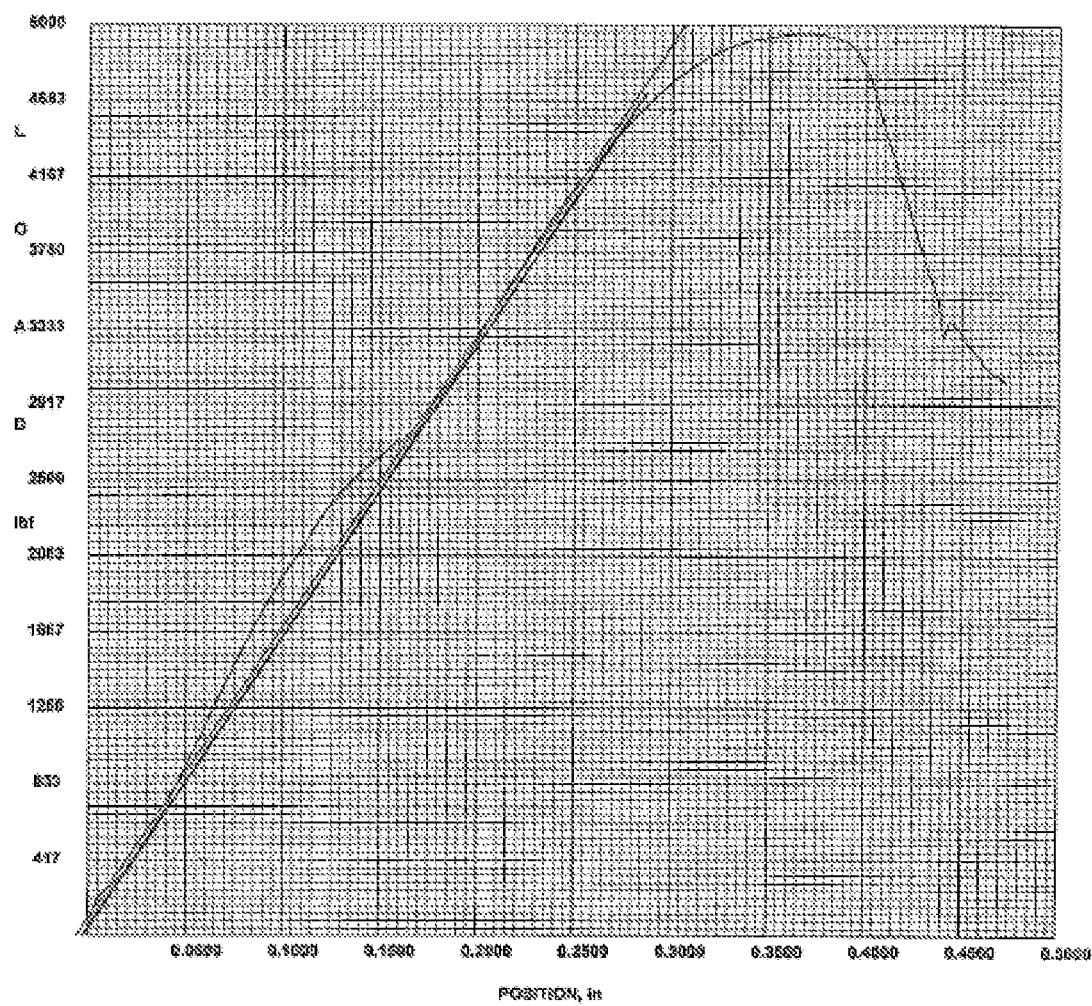
FIG. 51 is a summary of force testing information for sensor armor units in one embodiment of a vehicle sensor armor system.

Referring now to FIGS. 50 through 51, the functionality and performance of sensor armor units in one embodiment—specifically the embodiments of FIGS. 9 through 37—of a vehicle sensor armor system are shown. Sensor armor units were loaded into an axial compression testing machine and forces were gradually applied until the unit reached maximum deformation. Referring now to FIG. 50, one embodiment of a front sensor armor unit withstood 6,259 lbs of axial force, loaded perpendicular to its front and applied at centerline, mounted within Factory Part of Toyota Tundra Spindle. Referring now to FIG. 51, one embodiment of a rear sensor armor unit withstood 4,953 lbs of axial force loaded perpendicular to its front and applied at centerline, mounted within a custom blocking jib (i.e., not mounted to factory connection points).

Thus configured, invention includes one or more sensor armor units configured to protect a vehicle sensor, the one or more sensor armor units having a housing and two or more mount connections configured to attach to a vehicle at existing connection points without modifications and a plurality of contact points configured to contact the vehicle's structure and distribute forces away from a vehicle sensor and towards the vehicle's structure when the sensor armor unit is attached to a vehicle in operation. The vehicle sensor armor system provides robust protection against the risks of speed sensor damages through secure mounting to existing vehicle connections and optimal load displacement of forces experienced in off-roading and other applications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A vehicle sensor armor system comprised of a sensor armor unit configured to protect a vehicle sensor, the sensor armor unit having
   a housing;
   a first mount connected to the housing, the first mount configured to attach the sensor armor unit to a vehicle at a first fastener location on the vehicle's structure;
   a second mount connected to the housing, the second mount configured to attach the sensor armor unit to the vehicle at a second fastener location on the vehicle's structure.

2. The vehicle sensor armor system of claim 1, the first mount located adjacent to a first side of the housing, the second mount located adjacent to a second side of the housing that is opposite to the first side of the housing.

3. The vehicle sensor armor system of claim 1, the first mount comprising a first arm with an aperture.

4. The vehicle sensor armor system of claim 1, the second mount comprising an aperture.

5. The vehicle sensor armor system of claim 1, the second mount comprising a bracket with an aperture.

6. The vehicle sensor armor system of claim 1, the second mount comprising a second arm.

7. The vehicle sensor armor system of claim 1, the sensor armor unit further having a plurality of contact points configured to contact the vehicle's structure and distribute forces away from a vehicle sensor and towards the vehicle's structure when the sensor armor unit is attached to a vehicle in operation.

8. The vehicle sensor armor system of claim 1, the sensor armor unit further configured to attach to the vehicle with fasteners at existing OEM fastener locations and without further modification to the vehicle.

9. The vehicle sensor system of claim 1, the sensor armor unit a single piece of metal.

10. A vehicle sensor armor system comprised of
    a first sensor armor unit configured to protect a first vehicle speed sensor, the first sensor armor unit having
      a housing;
      a first mount connected to the housing, the first mount configured to attach the first sensor armor unit to a vehicle at a first fastener location on the vehicle's structure;
      a second mount connected to the housing, the second mount configured to attach the first sensor armor unit to the vehicle at a second fastener location on the vehicle's structure, the first mount located adjacent to a first side of the housing, the second mount located adjacent to a second side of the housing that is opposite to the first side of the housing
    a second sensor armor unit configured to protect a second vehicle speed sensor, the second sensor armor unit having
      a housing;
      a first mount connected to the housing, the first mount configured to attach the second sensor armor unit to the vehicle at a third fastener location on the vehicle's structure;
      a second mount connected to the housing, the second mount configured to attach the second sensor armor unit to the vehicle at a fourth fastener location on the vehicle's structure, the first mount located adjacent to a first side of the housing, the second mount located adjacent to a second side of the housing that is opposite to the first side of the housing.

11. The vehicle sensor armor system of claim 10, the first and second sensor armor units each having a plurality of contact points configured to contact the vehicle's structure and distribute forces away from vehicle speed sensors and towards the vehicle's structure when the vehicle sensor armor system is attached to a vehicle in operation.

12. The vehicle sensor armor system of claim 10, the vehicle sensor armor system further configured to attach to the vehicle with fasteners at existing OEM fastener locations and without further modification to the vehicle.

13. The vehicle sensor system of claim 10, the first sensor armor unit and second sensor armor unit each a single piece of metal.

14. A vehicle sensor armor system comprised of
a first sensor armor unit configured to protect a first vehicle speed sensor, the first sensor armor unit having
 a housing;
 an arm connected to and extending from the housing, the arm further configured to attach the first sensor armor unit to a vehicle at a first fastener location on the vehicle's structure;
 a bracket connected to the housing opposite the arm, the bracket configured to attach the first sensor armor unit to the vehicle at a second fastener location on the vehicle's structure;
a second sensor armor unit configured to protect a second vehicle speed sensor, the second sensor armor unit having
 a housing;
 an arm connected to and extending from the housing, the arm further configured to attach the second sensor armor unit to a vehicle at a third fastener location on the vehicle's structure;
 a bracket connected to the housing opposite the arm, the bracket configured to attach the second sensor armor unit to the vehicle at a fourth fastener location on the vehicle's structure;
a third sensor armor unit configured to protect a third vehicle speed sensor, the third sensor armor unit having
 a housing;
 a first arm connected to and extending from the housing, the first arm further configured to attach the third sensor armor unit to the vehicle at a fifth fastener location on the vehicle's structure;
 a second arm connected to and extending from the housing opposite the first arm, the second arm configured to attach the third sensor armor unit to a vehicle at a sixth fastener location on the vehicle's structure;
a fourth sensor armor unit configured to protect a fourth vehicle speed sensor, the fourth sensor armor unit having
 a housing;
 a first arm connected to and extending from the housing, the first arm further configured to attach the fourth sensor armor unit to the vehicle at a seventh fastener location on the vehicle's structure;
 a second arm connected to and extending from the housing opposite the first arm, the second arm configured to attach the fourth sensor armor unit to a vehicle at an eighth fastener location on the vehicle's structure.

15. The vehicle sensor armor system of claim 14, the first, second, third, and fourth sensor armor units each having a plurality of contact points configured to contact the vehicle's structure and distribute forces away from vehicle sensors and towards the vehicle's structure when the vehicle sensor armor system is attached to the vehicle in operation.

16. The vehicle sensor armor system of claim 14, further configured to attach to the vehicle using fasteners at existing OEM fastener locations and without further modification to the vehicle.

17. The vehicle sensor system of claim 14, the first, second, third, and fourth sensor armor units each a single piece of metal.

* * * * *